United States Patent
Deschênes

(10) Patent No.: US 12,267,000 B2
(45) Date of Patent: Apr. 1, 2025

(54) POWER CONVERTER MCU SYNCHRONIZATION

(71) Applicant: DCBEL INC., Montréal (CA)

(72) Inventor: Jean-Hugues Deschênes, Montréal (CA)

( * ) Notice: Subject to any disclaimer, the term of this patent is extended or adjusted under 35 U.S.C. 154(b) by 0 days.

(21) Appl. No.: 18/935,805

(22) Filed: Nov. 4, 2024

(65) Prior Publication Data

US 2025/0062673 A1    Feb. 20, 2025

Related U.S. Application Data

(63) Continuation of application No. PCT/CA2024/050508, filed on Apr. 19, 2024.

(60) Provisional application No. 63/497,350, filed on Apr. 20, 2023.

(51) Int. Cl.
*H02M 1/00*    (2007.01)
*H02M 7/48*    (2007.01)

(52) U.S. Cl.
CPC ........... *H02M 1/0012* (2021.05); *H02M 7/48* (2013.01)

(58) Field of Classification Search
CPC .... H02M 1/0025; H02M 1/00; H02M 1/0012; H02M 1/0041; H02M 1/0067; H02M 7/00; H02M 7/42; H02M 7/48; H02M 7/483; H02M 7/49; H02M 7/493

USPC .......................................................... 327/141
See application file for complete search history.

(56) References Cited

U.S. PATENT DOCUMENTS

| | | | |
|---|---|---|---|
| 10,038,371 B2 * | 7/2018 | Boucly | ............... H02M 3/1584 |
| 2003/0137856 A1 | 7/2003 | Sheng et al. | |
| 2009/0267658 A1 | 10/2009 | Bridge et al. | |
| 2015/0263607 A1 | 9/2015 | Boucly et al. | |
| 2022/0043038 A1 | 2/2022 | Matan et al. | |
| 2022/0123591 A1 | 4/2022 | Vaculik et al. | |

OTHER PUBLICATIONS

International application No. PCT/CA2024/050508 International Search Report dated Sep. 3, 2024.
International application No. PCT/CA2024/050508 Search Strategy dated Sep. 3, 2024.
International application No. PCT/CA2024/050508 Written Opinion of the International Searching Authority dated Sep. 3, 2024.

* cited by examiner

*Primary Examiner* — Hai L Nguyen
(74) *Attorney, Agent, or Firm* — Anglehart et al.

(57) ABSTRACT

A power converter controlled by a micro-controller unit (MCU) is effectively synchronized by using a signal received by a hardware subsystem of the MCU. The synchronization signal can control multiple power converters and can be generated by one power converter or a synchronization controller with generation of the synchronization signal generated using a hardware subsystem of an MCU, namely a hardware timer. The timer can be used to obtain a switch state from a memory table using direct memory access (DMA).

14 Claims, 5 Drawing Sheets

POWER CONVERTER MCU SYNCHRONIZATION

The present application is a continuation of PCT application serial number PCT/CA2024/050508, filed Apr. 19, 2024, designating the US, now that claims priority from U.S. provisional patent application No. 63/497,350 filed on Apr. 20, 2023, incorporated herein by reference.

TECHNICAL FIELD

This patent application relates to power converter technology, namely AC to DC rectifiers and battery chargers, DC to AC inverters, AC to AC converters such as AC motor controllers and DC to DC converters.

BACKGROUND

A power converter can have a microcontroller unit (MCU) programmed to provide the timing of power switches for operation of the power converter. The power converter usually has a reference signal to which the MCU responds to determine the switching mode or state. When two or more power converters work together, for example when two power converters are working in parallel to supply a common single phase output or in three-phase power converters, a single controller is typically used to drive separate power converter circuits for each phase.

SUMMARY

Applicant has found that a power converter controlled by an MCU can be effectively synchronized by using a signal received by a hardware subsystem of the MCU. The synchronization signal can control multiple power converters and can be generated by one power converter or a synchronization controller with generation of the synchronization signal generated using a hardware subsystem of an MCU.

Direct memory access (DMA) is a feature of an MCU that allows certain hardware subsystems of the MCU to access main MCU memory independently of the central processing unit (CPU). Applicant has found that using a timer subsystem of an MCU can be used to write into memory using DMA a synchronization value that is accessed by software executed by the MCU to control power converter switch states.

BRIEF DESCRIPTION OF THE DRAWINGS

The invention will be better understood by way of the following detailed description of embodiments of the invention with reference to the appended drawings, in which.

DETAILED DESCRIPTION

Figure 1:
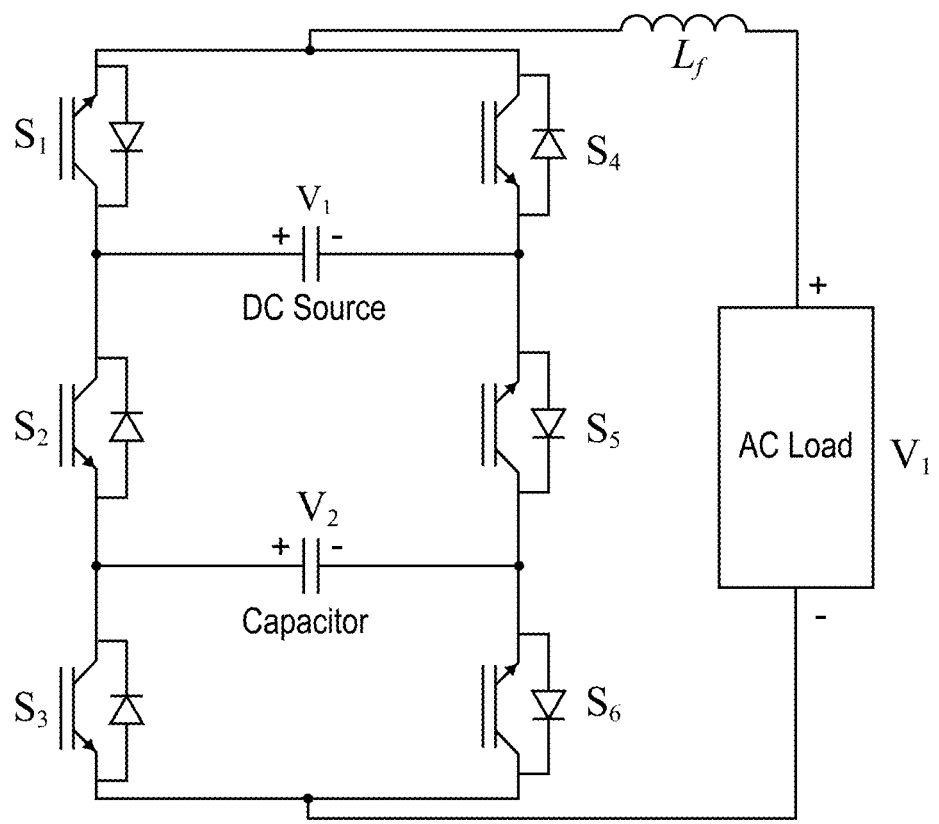
FIG. 1 is a circuit diagram of a five-level inverter having six power switches as is known in the prior art.

FIG. 1 is a circuit diagram of one type of inverter. It will be appreciated that the embodiments described herein are not limited to the number of levels of the power converter, or the type of power conversion. A number of power switches, in the example of FIG. 1 that number is six, are controlled by a controller, and in the embodiments described herein the controller is an MCU. In FIG. 1, a DC source V1 is the power input, for example a battery or a solar panel input, and the power output is AC power. Other circuit elements, such as inductors and capacitors may help stabilize the power conversion.

Figure 2:
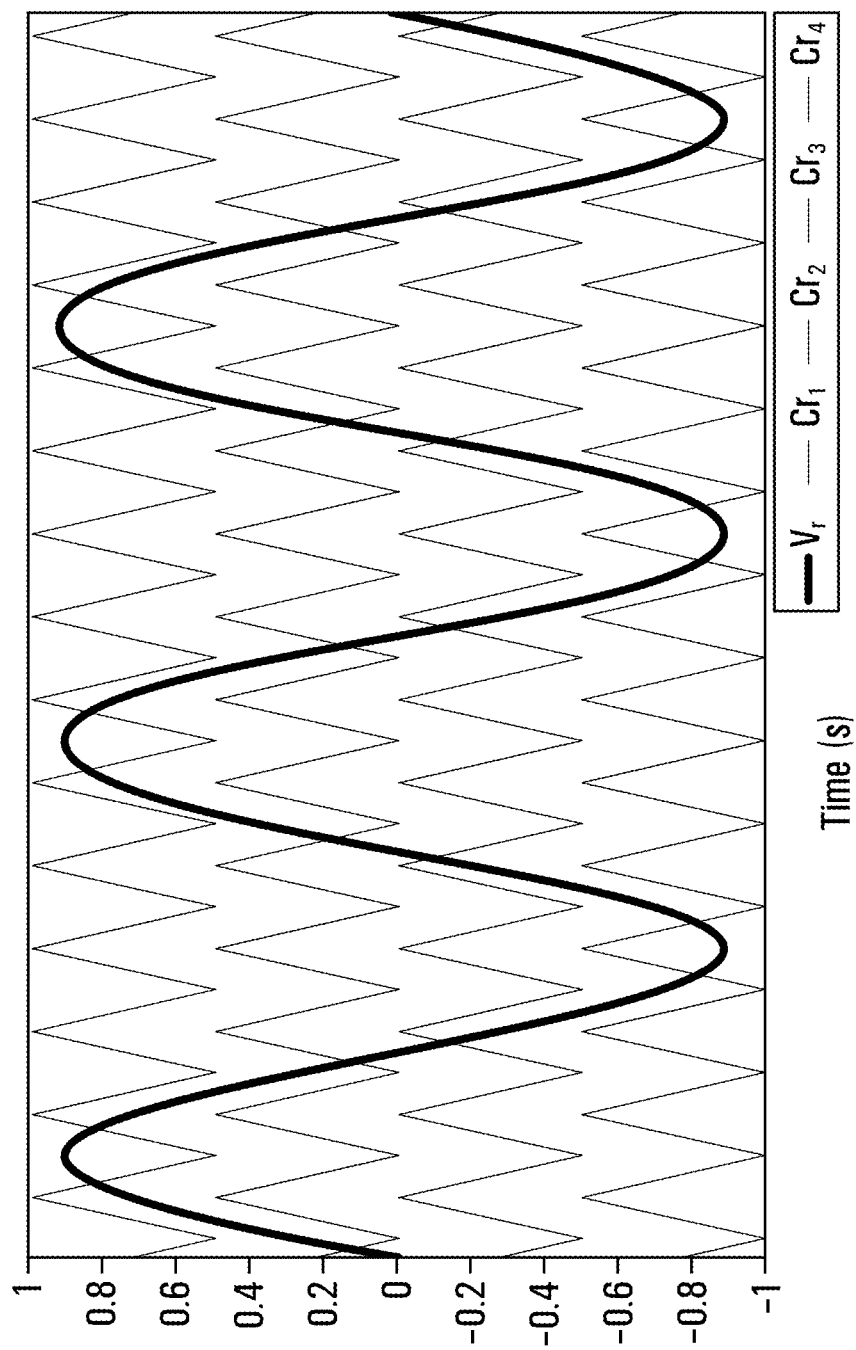
FIG. 2 is a graph of a sine wave voltage reference signal and four carrier reference signals $Cr_1$ to $Cr_4$ as may be used in a power inverter or rectifier having a five level design as in known in the prior art.

In a conventional power conversion circuit, the gate signals for the power switches can be generated using digital and analog circuitry rather than in software. FIG. 2 illustrates the AC output sine wave signal, Vr, along with high frequency carrier signals used to define the gate signals for the switches of FIG. 1. As is known in the art, the carrier signals are typically of a frequency much higher than is illustrated. The carrier signal oscillates between being greater than the reference Vr and less than the reference Vr with a resulting duty cycle that is imposed on the gate signals to the power switches. The inverter of FIG. 1 is a five-level inverter, meaning that the switches cause the output to have a pulse-width modulation between 0V and V2 for the first 45 degrees of the sine wave, between V2 and V1 for the next 90 degrees of the sine wave, between 0V and V2 for the next 45 degrees, between 0V and –V2 for the next 45 degrees, between-V2 and –V1 for the next 90 degrees and between-V2 and 0V for the last 45 degrees of the 360 degree sine waveform. V2 has a value that is ½V1. In this way, the output of the inverter circuit of FIG. 1 will follow Vr.

When implementing the switch gate control using an MCU, software decisions are made to set the instantaneous gate signals, namely ON or OFF. Such software decisions may replicate the behavior of hardware using carrier signals as illustrated in FIG. 2.

When an MCU-based power converter is working alone and does not need to be synchronized, it can generate its own Vr in software. However, when Vr must be synchronized, the MCU-based power converter needs to have an accurate value for Vr in real time.

A typical MCU will have various hardware level components able to receive an input that can be used to receive a reference signal. For example, a data signal can be received from a serial port interface. An integrated analog-to-digital converter (ADC) of an MCU could receive an analog reference signal and convert it to a digital value that the MCU processor can read. These options are too slow to allow for reliable real time synchronization. If the processor had to take a received value from a serial port and store that value in memory, the delay in having access to a current Vr value can lead to a lack of synchronization and loss of efficiency.

Figure 3:
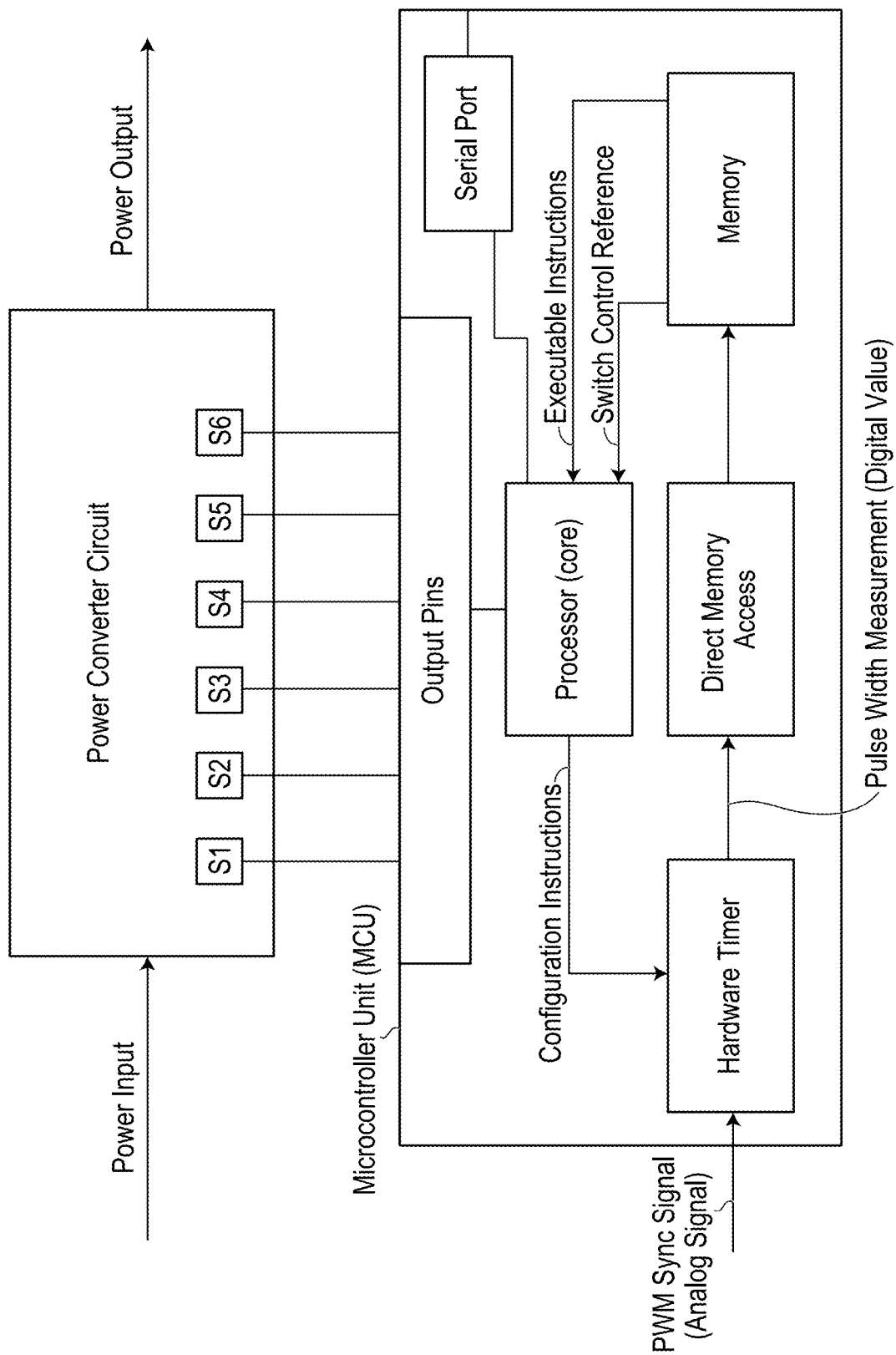
FIG. 3 is a block diagram of an MCU power converter configured to receive a high-frequency synchronization PWM signal from a reference distributor at its timer and set a synchronization value in memory from the timer according to one embodiment.

In the embodiment of FIG. 3, the MCU may have two hardware timer circuits. A first hardware timer is configured to measure an input PWM sync signal. The PWM sync signal varies from a minimum (non-zero) pulse width to a maximum (non-100%) pulse width that represents the instantaneous Vr value. When the reference value is an alternating signal, as illustrated in FIG. 2, the pulse width variation is mapped to a variation in Vr from −V1 to +V1. The sync signal is of a relatively high frequency compared to the Vr signal frequency, so that the Vr value measured by the timer is updated frequently in real time. For example, the sync signal may be above 5 kHz, for example around 30 KHz. The timer measures the pulse duration and records the duration in one of its registers, optionally publishing it to the memory of the MCU in memory using DMA of the MCU.

The software executed by the processor of the MCU can set the gate signals on output pins of the MCU in real time to provide the PWM for the power converter circuit. The gate signals may be either controlled directly by the CPU core, operating in GPIO (general purpose input/output) mode, or may be controlled by a second hardware timer. This second hardware timer may be regularly updated by the CPU core with new pulse widths to be applied on the output pins. At the speed of the execution of the gate control program code, gate signals can be updated. When Vr changes its value, the program code will immediately change the duty cycle of the gate states accordingly. For example, the program code may complete a loop, such as a for loop or a do loop, for a duration set by the Vr reference. When the timer changes the value Vr in memory using DMA, this immediately changes the length of the loop.

While FIG. 3 illustrates the MCU providing individual outputs for each of the power switches, it will be appreciated that it is possible to output fewer gate signals and to use logic gates and/or inverters to provide the signals applied to the gates of all power switches.

It will also be appreciated that while the outputs from the MCU to the power converter circuit are shown to be the power switches associated with an inverter as illustrated in FIG. 1, it will be appreciated that power switches associated with a buck or boost DC/DC converter forming part of the power converter circuit can also be controlled. Adjusting the buck/boost can adjust the amplitude of the output AC voltage from an inverter or the DC output voltage from a rectifier, whereas the power switches in FIG. 1 are switched in accordance with the phase of the AC signal. Synchronizing the amplitudes of the power converters can be achieved by using a hardware timer in a manner similar to the phase synchronization, or if amplitude synchronization is less time sensitive, it can be sent from the main controller to the MCUs by data bus signaling.

The use of the hardware timer that operates independently of the processor to update the current value of Vr allows for the software to have access to the most accurate Vr value during execution.

Figure 4:
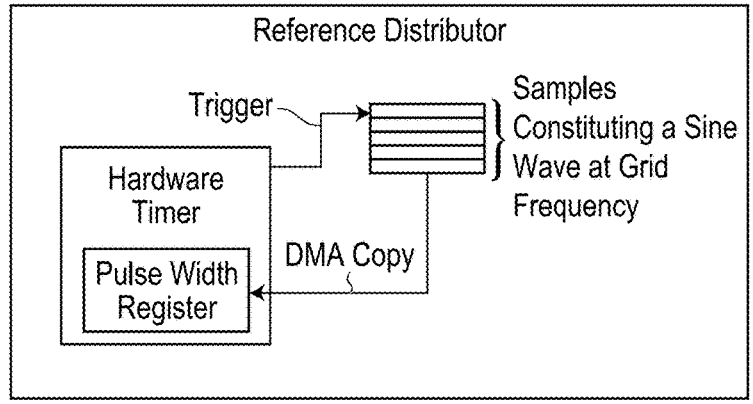
FIG. 4 is a block diagram of an MCU configured as a reference distributor according to one embodiment.

As illustrated in FIG. 4, there is one centralized reference. It propagates the reference sine wave representing the amplitudes that are to be driven onto the electrical network in the case of an inverter (for an AC-DC converter, it may represent the input AC voltage). This reference sine wave is pulse-width-modulated onto a wire. A separate timer may be used for each power converter such that the timer output goes to a single power converter. The pulse widths therefore represent the sine wave's amplitude at any moment. As described with reference to FIG. 3 above, the distributed inverters are receivers of this pulse width-modulated signal. The pulse width may be recovered and stored in the inverters' memory at a known location. When in need to decide which voltage level to drive onto the electrical network, software running on each inverter may look up the recovered amplitude.

To perform this sine wave propagation with high accuracy and determinism using common off-the-shelf microcontrollers, a hardware timer is used. The timer can run at a much higher speed than the sine wave it propagates. As this timer progresses, it triggers a DMA transaction that copies a sine wave amplitude value from a reference table in memory to a hardware register associated with the timer. The index in the table may be advanced with each clock cycle of the timer until the end of the table at which time the index is reset to the start of the table. In this way the DMA is used to read real time values at intervals set by the timer and not the processor of the MCU of the reference distributor. This hardware register controls the width of the pulse being sent out to the downstream inverters or power converters. The aforementioned sine wave amplitude values have been pre-filled in the table and the DMA engine progresses through them one by one, in a circular fashion, namely it may return to slot 0 after having gone through all entries.

Figure 5:
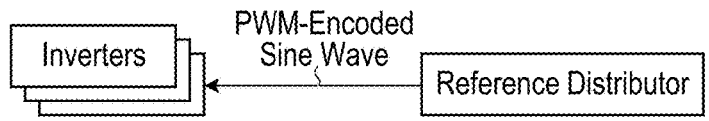
FIG. 5 is an illustration of a multiple power converter system according to some embodiments.

At the other end, the inverters/power converters receiving the PWM-encoded sine wave may also use a hardware timer, this time in PWM input mode, as described above with reference to FIG. 3. FIG. 5 illustrates how one reference distributor can control a number of power converters, in the example the distributor controls three inverters.

Use of hardware timers allows to do this work without any software intervention after having configured the hardware timers in both devices, therefore providing this functionality with no software overhead.

A sample MCU code to define and load the PWM values into the circular memory table at the sender can be:

```
buildPwmEncodedSamples( )
    numSamples = pwmRate/encodedSignalPeriod
    for (index: numSamples)
        sampleToEncode = sin(2*pi*index / numSamples)
        samples[index] = sampleToEncode * pwmResolution
```

An example of a suitable MCU is an STM32 microcontroller from STMicroelectronics. The command/instruction/settings given for the STM32 to cause the sender DMA controller to advance its index in the circular memory table and to load the digital PWM value into the register with fixed (jitter-free) intervals can be:

```
StartPwmGeneration( )
    setTimerMode(timer,    pwmGeneration,    enablePreload,
    resetCounterOnPeriodEnd, triggerOutputOnReset)
    setDmaMode(memoryToPeripheral)
    HAL__TIMEx__PWMN__Start(timer, channel)
    HAL__TIM__DMABurst__MultiWriteStart(timer,
    counterCompareRegister, samples , numSamples)
```

Timers may run continuously by default. Supplying the resetCounterOnPeriodEnd argument above causes the timer to generate an accurate period. triggerOutputOnReset causes DMA to be triggered at the end of a period, important to synchronization.

The command given to the receiver timer to measure the sync pulse and convert it to a digital value and store it in the register may be:

```
StartPwmMeasurement( )
    setTimerMode(timer,    pwmInput,  resetOnExternalRisingEdge,
latchOnExternalFallingEdge)
        HAL_TIM_IC_Start (timer, channel)
```

At this point, the counter register may contain the hardware-measured pulse from the last period.

While the reference distributor is illustrated as an independent component in FIGS. 4 and 5, it will be understood that the MCU that generates the sync signal may also control gate signal associated with one of the power converters.

Figure 6:
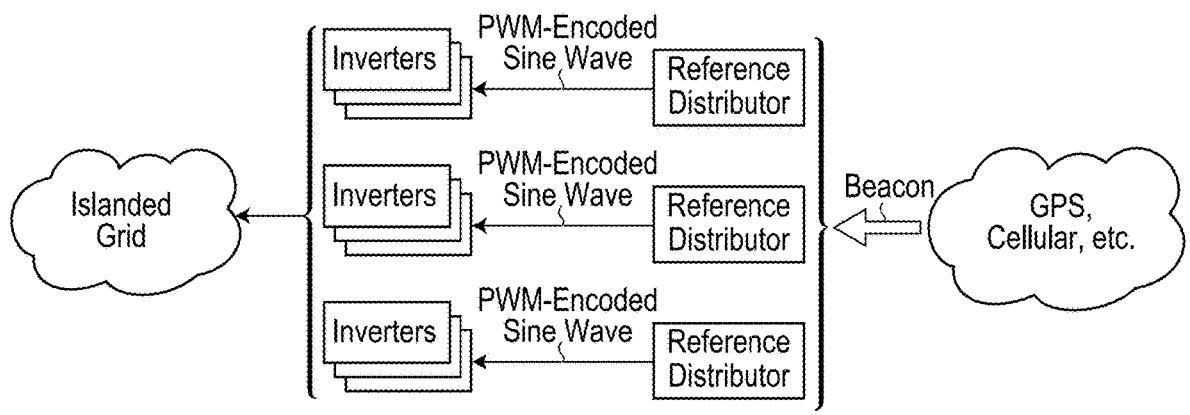
FIG. 6 is an illustration of a system of geographically dispersed synchronized power inverters.

When many such arrangements of power converters, in particular power inverters, are to be deployed in geographically dispersed locations, while contributing to the same electrical network, synchronization of the inverters is still necessary but use of a wired PWM-encoded signal over long distances is no longer desirable. To this end, the previously described inverter and clock master arrangement at each location can be replicated as illustrated in FIG. 6. The distributed clock masters may then be synchronized to a universal, wireless reference. This can be the beacon of cellular networks, the reference pulse of GPS signals, or others.

This reference pulse may be used as a starting point for navigating the pre-filled buffer or table of sine wave samples that gets copied through DMA transactions.

Figure 7:
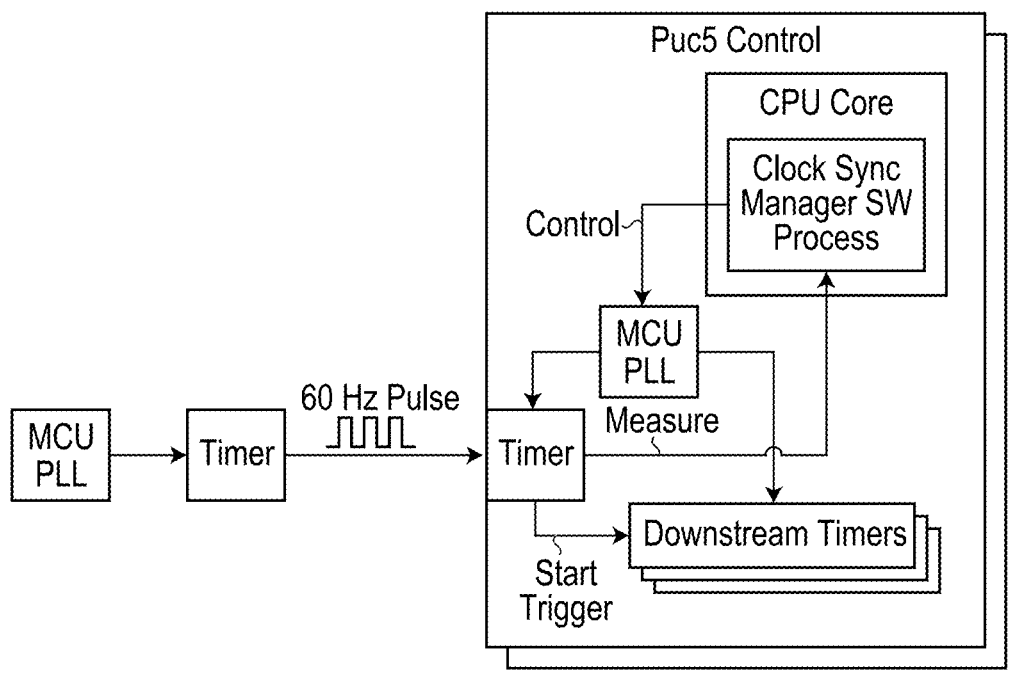
FIG. 7 is a block diagram showing a reference distributor issuing a low frequency main phase trigger signal using its timer to synchronize an MCU-based power converter receiving the trigger signal at its timer to synchronize a downstream high-frequency timer for setting a synchronization value in memory according to one embodiment.

In a similar manner, local synchronization of power converters can use a low frequency pulse from a distributor, for example as illustrated in the embodiment of FIG. 7. At a frequency of 50 Hz or 60 Hz, a timer of the distributor MCU can generate a sync signal for Vr. It will be appreciated that this sync signal could be at half or twice the Vr frequency, or any desired multiple/fraction. This sync signal can be used by the receiving MCU to trigger higher frequency timers, for example a "downstream" timer running at the frequency of the reference distributor of FIG. 4.

The downstream timer can be used to trigger a DMA operation to take a digital value from a table, as in the embodiment of FIG. 4, and then to place that value into memory for the software as in FIG. 3, or to trigger a DMA operation to change an indirect memory access pointer so that the software accesses directly the correct value from the table.

However, by restarting the downstream timer with the receiver timer, it is not possible for different MCU power converters receiving the same sync signal to drift over time.

It will be appreciated in the embodiment of FIG. 7, two or more MCU-based power converters, such as a PUC5 inverter, can be synchronized frequency-wise, so that the processes do not drift over time. Such power converters may be phase locked, so that the decision points (for PWM pulses, for example) are well controlled (whether perfectly in sync or intentionally offset).

In the case of combining multiple inverters, they must be synchronized to drive the exact same voltage level onto the network at exactly the same moment. If each inverter has its own MCU, it is possible to synchronize to the attached network by recovering through a PLL (phase-locked loop). PLL is typically used to recover clock and phase information from an electrical grid. In this embodiment, PLL is being used, for example, in non-grid-tied inverters, where inverters are teamed up to "form a local" grid.

It will be appreciated that in the context of an MCU, there are two different kinds of PLL that can be involved. One kind is a software process that analyzes sampled data. In the case of power inverters, that sampled data can be the 50 Hz or 60 Hz voltage signal from the grid. The phase and frequency information can be recovered and used to inject voltage synchronously onto the grid or and/or intentionally de-phase current and voltage to adjust active vs reactive power delivery. In rectifier mode, the phase and frequency information can be used to activate the switches at the right moment. The other kind is a hardware component that is used to create a clock for a hardware circuit, based on a reference clock, typically obtained from a crystal-based oscillator. In this way, the CPU can build an internal clock in the hundreds of MHz range from a crystal in the tens of MHz range.

An example of a suitable MCU is an STM32 microcontroller from STMicroelectronics. Phase-locked loops (PLLs) of the MCUs may operate in fractional mode, providing dynamic adjustability. A reference pulse can be sent from the distributor or main control (by a hardware timer) and be measured by a hardware timer in each of the power converters (referenced as Puc5 Control in FIG. 7). The clock sync manager will expect a specific number of clock increments between two pulses and adjust the PLL's fractional component to reach its target. The power converter's MCU downstream hardware timers will be started by a trigger propagated from the clock sync manager's timer. Within the MCU, a proportional integral (PI) controller's input is the captured count, whose target value is 0.

In the specific example of FIG. 7, it will be appreciated that the main control or sync distributor MCU may have a nominal frequency of 478.5 MHZ, such that there is room for adjusting towards 480 MHz. 478.5 Mhz also has the benefit of being able to be divided down in integer units.

The timer receiving the low frequency sync signal can roll over at the expected cycle count (478.5 Mhz/2/60 Hz=3987500 cycles). It may have a latched value from counter 1 that is exactly 0 if local clock is in sync with master clock (from Main Control). Frequency errors may be accumulated and fed to a PI controller, to be brought down to 0. The PI controller output may control the fractional part of a PLL.

When combining power converters, the boost or buck converter side PWM working at the same frequency can be offset in phase to reduce current ripple. For example, opposing two inverters by 180 degrees can be done by taking into account the LSB of the inverter address bit (in the case of bus control, for example using a CAN bus) and reversing the appropriate sawtooth when syncing to the reference pulse. The goal here is to shift 180 degrees the power switches (e.g., the IGBTs) on period, in the boost or buck converter side of the design. This way, resulting current ripple is reduced and constant. In the case of three inverters, the offset can be by 120 degrees, and in the case of four inverters, 90 degrees. Thus the phase offset for the boost/buck stage of the power converters are 360 degrees/the number of combined power converters.

In the case of an STM32 microcontroller, and in particular the STM32H743, the selected input timer can be TIM2, since it is a 32-bit timer (giving the right accuracy) and can send trigger out events to TIM1, 3, 4, 8, 12 and HRTIM.

An example of the command given to the sender timer to generate the 60 Hz (50 Hz in Europe) clock is:

```
StartPulseGeneration( )
    setTimerMode(timer,    pwmGeneration,    enablePreload,
resetCounterOnPeriodEnd)
        HAL_TIMER_PWM_Start(timer, channel)
```

An example of the command given to the receiver timer to have its master clock synchronize to the sender's timer signal, and the command given to generate sub-divided higher speed clocks is:

```
StartPwmMeasurement( )
    setTimerMode(timer2,      pwmInput,      nominalPeriod,
resetOnExternalRisingEdge, latchOnExternalFallingEdge, triggerOutput)
    HAL_TIM_IC_Start (timer2, channel, onInputRisinEdge)
```

Since other timers may be configured to start on timer2's trigger, and since clocks for all other timers (as well as the CPU core) may be derived from the same PLL, all internal modules may be synchronized, and phase aligned to timer2.

An example of the command given to the receiver to create the index value for reading from the table and to store the PWM value in the register is:

```
StartSineWave( )
    setTimerMode(timer2,      counterMode,      enablePreload,
resetCounterOnPeriodEnd, triggerOutputOnReset)
    setDmaMode(dmaChannel,                    memoryToMemory,
sourceCircularMode, destFixedAddressMode)
    startDma(dmaChannel, samples, numSamples, currentSample)
    HAL_TIM_PWM_Start(timer2)
```

It will be appreciated that by measuring the inter-pulse duration in timer2 in each downstream board provides synchronization. If the upstream and downstream boards are perfectly synchronized, then the measured period in the downstream board will be the exact same length as in the upstream board. Any "error" (difference between nominal and measured period) can be fed to a PI controller, whose output can be written to the PLL "fine adjustment" register.

What is claimed is:

1. A method for synchronizing a plurality of power converters each having power switches controlled by a microcontroller unit (MCU) having a processor, a memory, at least one integrated hardware timer and direct memory access (DMA), the method comprising:
    providing a synchronization signal to said hardware timer of said MCU of each of said plurality of power converters;
    in each of said plurality of power converters, executing processor instructions stored in said memory to issue control signals for said power switches, said processor instructions referencing a value in said memory defining a duty cycle for control of said power switches; and
    in each of said plurality of power converters, using an output of said hardware timer to control using DMA to change said value in said memory.

2. The method as defined in claim 1, wherein said synchronization signal is a pulse stream whose pulse length defines an instantaneous reference, and said using an output of said hardware timer to control using DMA to change said value in said memory changes said value at a frequency of said synchronization signal.

3. The method as defined in claim 2, wherein said synchronization signal has a frequency above 5 kHz, with a maximum frequency of said power switches being above 10 KHz.

4. The method as defined in claim 1, wherein said synchronization signal is a pulse stream defining a phase reference point of a reference signal, and said using an output of said hardware timer to control using DMA to change said value in said memory comprises using said synchronization signal to trigger a downstream timer, using a count value from said downstream timer to change said value in said memory.

5. The method as defined in claim 4, wherein said synchronization signal has a frequency of 50 Hz or 60 Hz, with a maximum frequency of said power switches being above 10 KHz.

6. The method as defined in claim 4, further comprising, in each of said plurality of power converters, storing in said memory a table of reference values, changing an index for said table with each count value from said downstream timer, and using DMA to change said value in said memory using the value in said table pointed by said index.

7. The method as defined in claim 6, wherein said synchronization signal has a frequency of 50 Hz or 60 Hz, with a maximum frequency of said power switches being above 10 KHz.

8. A power converter comprising:
    a plurality of power switches;
    a microcontroller unit (MCU) connected to gates of said plurality of power switches and having a processor, a memory, at least one integrated hardware timer and direct memory access (DMA);
    said hardware timer of said MCU able to receive a synchronization signal;
    said memory storing switch control reference values and processor instructions that when executed by said processor cause said processor to:
        issue control signals for said power switches, said processor instructions referencing one of said switch control reference values in said memory defining a duty cycle for control of said power switches; and
        use an output of said hardware timer to control using DMA to change said value in said memory.

9. The power converter as defined in claim 8, wherein said synchronization signal is a pulse stream whose pulse length defines an instantaneous reference, and said instructions cause said processor to use an output of said hardware timer to control using DMA to change said value in said memory changes said value at a frequency of said synchronization signal.

10. The power converter as defined in claim 9, wherein said switch control reference values correspond to said synchronization signal having a frequency above 5 kHz, with a maximum frequency of said power switches being above 10 KHz.

11. The power converter as defined in claim 8, wherein said synchronization signal is a pulse stream defining a phase reference point of a reference signal, and said using an output of said hardware timer to control using DMA to change said value in said memory comprises using said synchronization signal to trigger a downstream timer, using a count value from said downstream timer to change said value in said memory.

12. The power converter as defined in claim 11, wherein said synchronization signal has a frequency of 50 Hz or 60 Hz, with a maximum frequency of said power switches being above 10 KHz.

13. The power converter as defined in claim 11, wherein said switch control reference values comprise a table of reference values, and said instructions cause said processor to change an index for said table with each count value from said downstream timer, and using DMA to change said value in said memory using the value in said table pointed by said index.

14. The power converter as defined in claim 13, wherein said synchronization signal has a frequency of 50 Hz or 60 Hz, with a maximum frequency of said power switches being above 10 KHz.

\* \* \* \* \*